United States Patent
Armstrong et al.

(10) Patent No.: US 6,983,814 B2
(45) Date of Patent: Jan. 10, 2006

(54) OIL TANK CAP

(75) Inventors: Jeffrey L. Armstrong, Fredonia, WI (US); Benjamin M. Wright, Sullivan, WI (US)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 0 days.

(21) Appl. No.: 10/617,536

(22) Filed: Jul. 11, 2003

(65) Prior Publication Data

US 2005/0006160 A1 Jan. 13, 2005

(51) Int. Cl.
*B65D 41/04* (2006.01)

(52) U.S. Cl. ............... 180/219; 220/288; 220/86.2; 220/DIG. 33

(58) Field of Classification Search .......... 180/219; 220/288, 289, 290, 291, 292, 293, 294, 295, 220/296, 297, 298, 299, 300, 301, 302, 303, 220/304, 86.2, DIG. 33, 757, 203.22
See application file for complete search history.

(56) References Cited

U.S. PATENT DOCUMENTS

| 5,158,123 A | * | 10/1992 | Senko ................. 141/338 |
| 5,627,351 A | * | 5/1997 | Okuma et al. ........... 181/231 |
| 6,209,745 B1 | * | 4/2001 | Jansson .................. 220/288 |
| 6,286,704 B1 | * | 9/2001 | Harris .................... 220/304 |
| 6,648,160 B2 | | 11/2003 | Hotch |
| 2002/0158072 A1 | * | 10/2002 | Hotch .................... 220/288 |

FOREIGN PATENT DOCUMENTS

| JP | 2002347454 A | * | 12/2002 |
| JP | 2003040312 A | * | 2/2003 |

OTHER PUBLICATIONS

Custom Chrome, 1989 Catalog, Jan. 1, 1989, pp. 395-399.

* cited by examiner

*Primary Examiner*—Kevin Hurley
(74) *Attorney, Agent, or Firm*—Michael Best & Friedrich LLP

(57) ABSTRACT

A motorcycle comprising a frame, a front wheel coupled to the frame, and a rear wheel coupled to the frame. An engine is supported by the frame and is adapted to propel the motorcycle. An oil tank is supported by the frame and includes an inlet defining an inlet aperture having an inlet axis. An oil tank cap is rotatable about the inlet axis between an inserted position and a sealed position. The oil tank cap has a movable portion that is movable substantially along the inlet axis between a retracted position and an extended position.

20 Claims, 9 Drawing Sheets

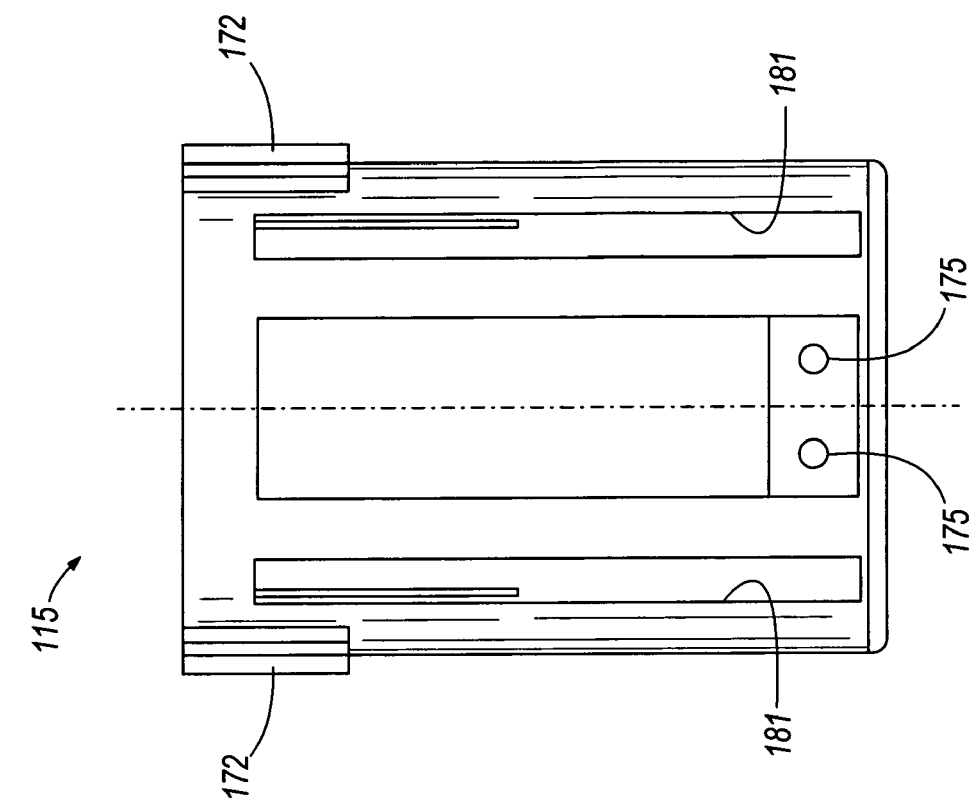
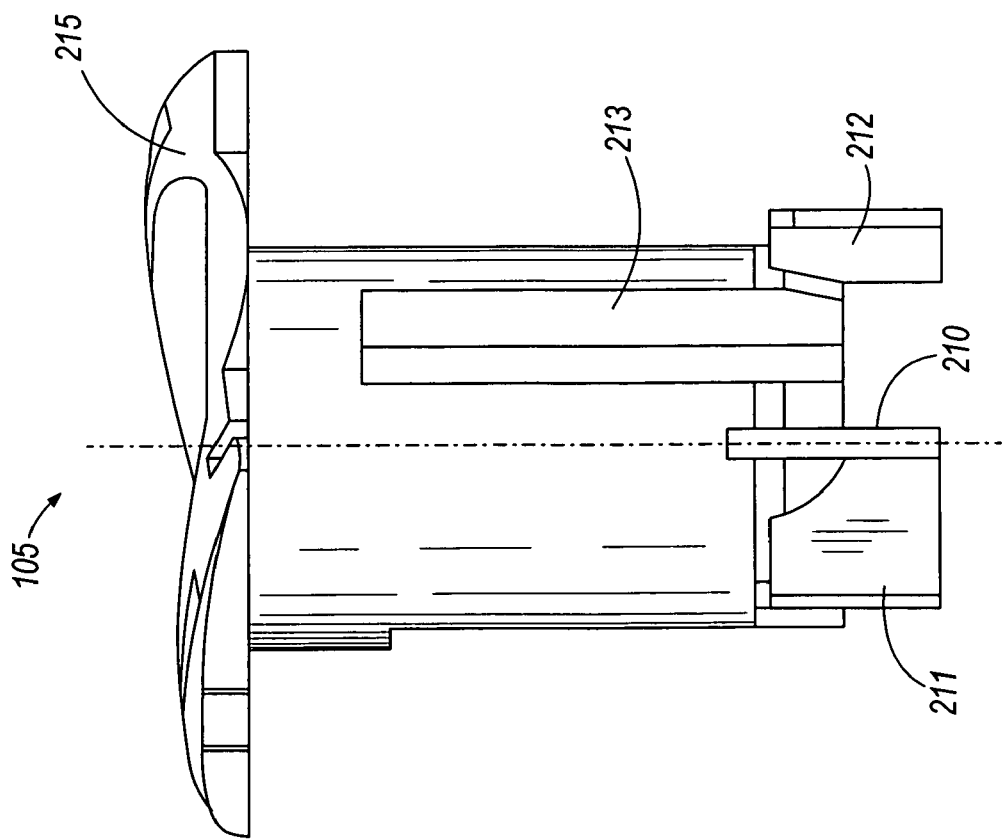

OIL TANK CAP

BACKGROUND OF THE INVENTION

The present invention generally relates to motorcycles, and particularly to motorcycles that include oil tanks with caps.

Many motorcycles include a lubricating oil system that uses a tank to store the lubricating oil. Generally, the tank is supported by the motorcycle frame and is often highly visible. In addition, the tank includes a fill spout near the top that allows the user to fill the tank with oil. A cap fits within the fill spout to close the tank and inhibit oil from leaking out and dirt or water from leaking in. In most oil tanks the fill spout and the cap extend above the outer surface of the oil tank. This can be unsightly and can contribute to damage if the cap or fill spout is bumped or impacted during use of the motorcycle.

SUMMARY OF THE PREFERRED EMBODIMENT

The present invention provides a motorcycle including an oil tank that includes an oil cap. The cap engages the tank and rotates about a cap axis between an inserted position and a sealed position. Additionally, a first portion of the cap is movable axially along the longitudinal axis of the cap relative to the remainder of the cap between an extended position and a retracted position. In one construction, the top surface of the cap is flush with the outer surface of the oil tank when the cap is rotated to the sealed position and the first portion of the cap is in the retracted position.

BRIEF DESCRIPTION OF THE DRAWINGS

The detailed description particularly refers to the accompanying figures in which:

FIG. 7 is a side view of a movable member of the oil tank cap of FIG. 2;

FIG. 8 is a side view of a guide member of the oil tank cap of FIG. 2;

Figure 1:
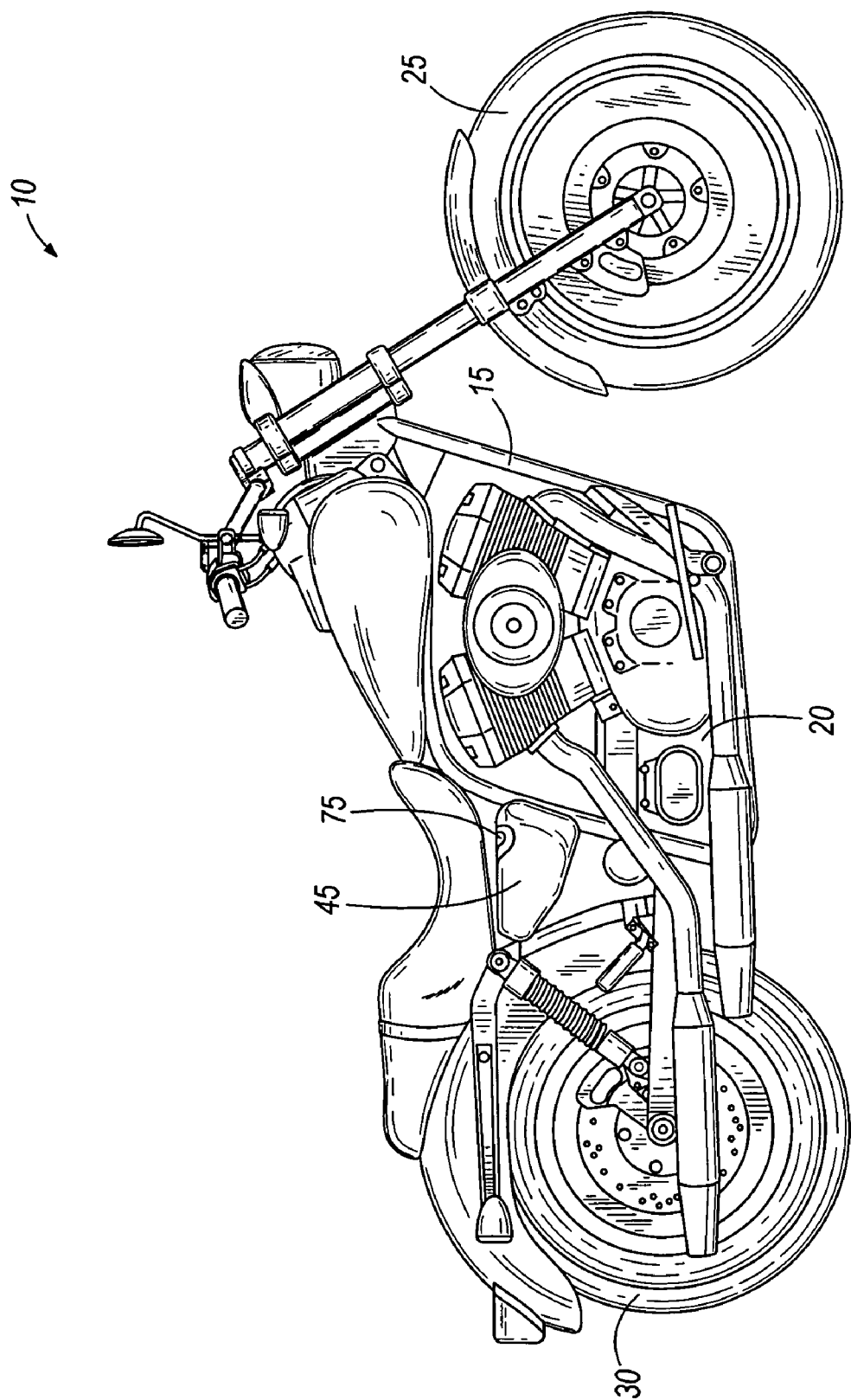
FIG. 1 is a right side view of a motorcycle including an oil system.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "having", "including", and "comprising" and variations thereof herein is meant to encompass the items listed thereafter and equivalents thereof as well as additional items. The use of letters to identify elements of a method or process is simply for identification and is not meant to indicate that the elements should be performed in a particular order.

DETAILED DESCRIPTION OF THE DRAWINGS

FIG. 1 illustrates a motorcycle 10 including a frame 15 that supports an engine/transmission assembly 20, a front wheel 25, and a rear wheel 30. The front wheel 25 is pivotally coupled to the frame 15 to allow a rider to steer the motorcycle 10. The rear wheel 30 is coupled to the engine/transmission assembly 20 such that operation of the engine/transmission assembly 20 rotates the rear wheel 30 to propel the motorcycle 10.

Figure 2:
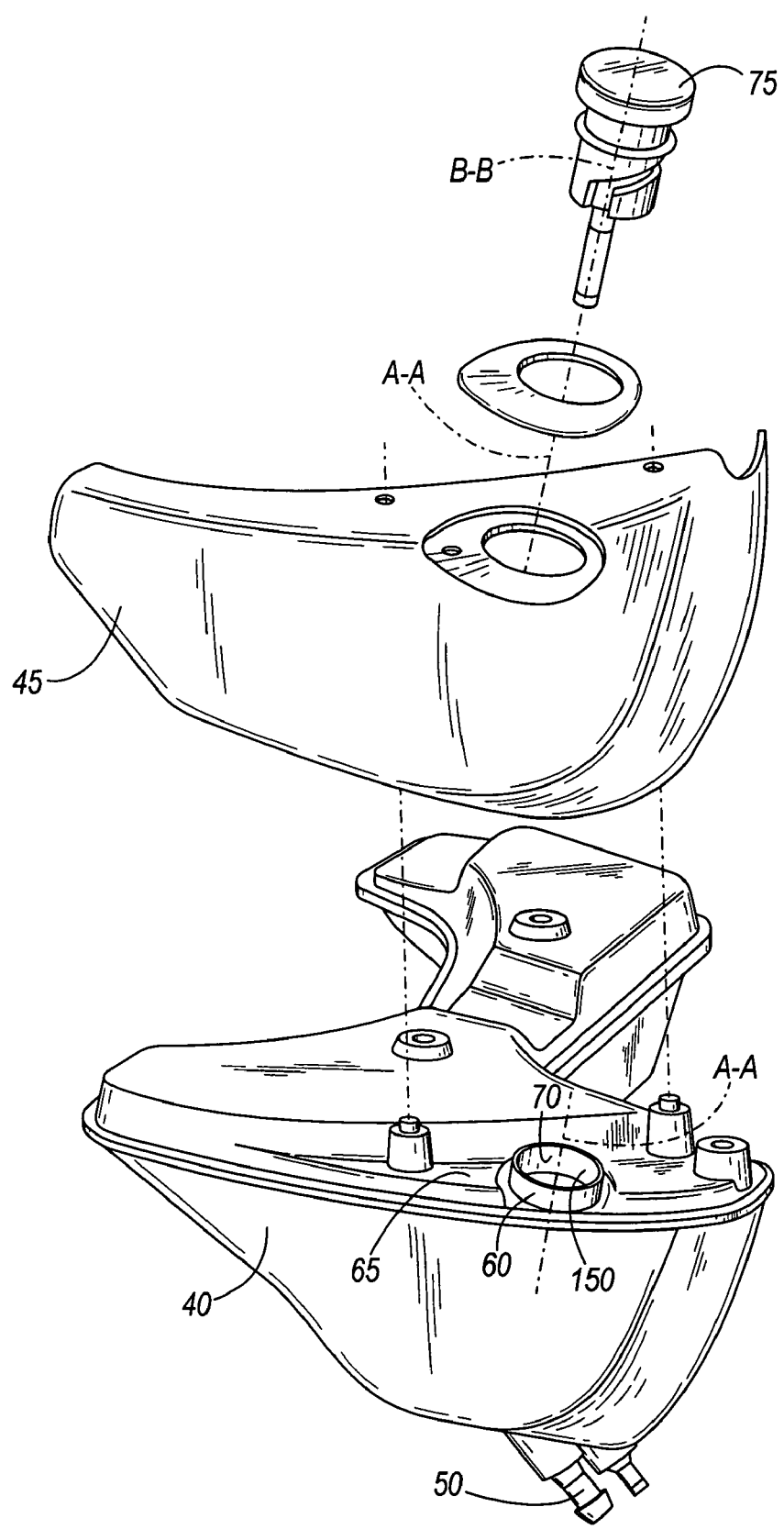
FIG. 2 is an exploded view of a portion of the oil system of FIG. 1 including an oil tank cap embodying the present invention.

Also included on the motorcycle 10 is a lubrication oil system that includes an oil tank 40 (shown in FIG. 2) and a cover 45 covering at least a portion of the oil tank 40. The oil tank 40 attaches to the frame 15 or to a support member that supports the oil tank 40 in a substantially fixed position relative to the frame 15. Referring to FIG. 2, the oil tank 40 includes one or more oil outlets 50 that allow oil to flow to the engine 20 and one or more return oil inlets (not shown) where oil from the engine 20 returns to the tank 40. The tank 40 may also include baffles or other similar devices that allow the oil time to cool and de-aerate before being routed back to the engine 20. It should be noted that some constructions of the motorcycle 10 do not include a cover 45.

As shown in FIG. 2, a fill spout 60 extends beyond an outer surface 65 of the tank 40 to a position that allows a user to fill the oil tank 40 with oil. The fill spout 60 defines an aperture 70 that extends along an inlet axis A—A and is sized to receive a cap 75. With the cap 75 installed, the fill spout 60 is substantially sealed from the outer environment. Thus, the cap 75 inhibits the escape of oil from the tank 40 as well as the introduction of foreign compounds (e.g., sand, dirt, water, or other debris) into the tank 40.

Figure 12:
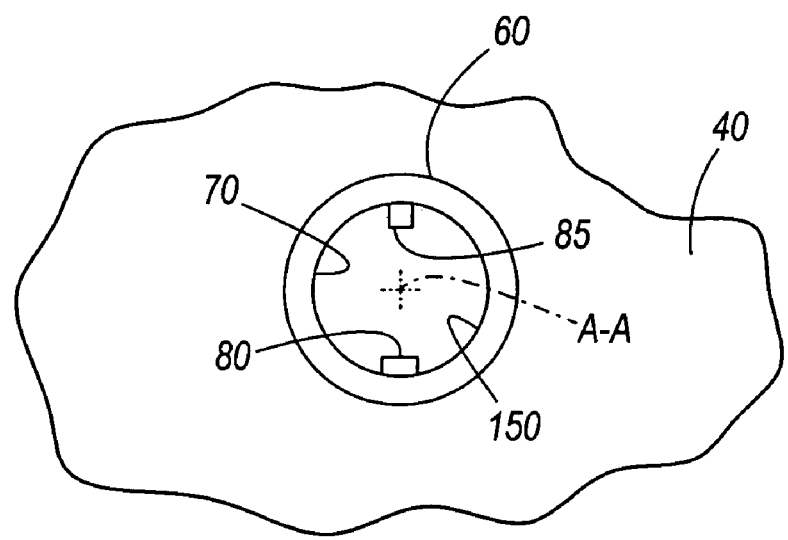
FIG. 12 is an enlarged view taken along line 12—12 of FIG. 2.

The fill spout 60 includes a large tab member 80 and a small tab member 85 (illustrated in FIG. 12) disposed such that they project into the aperture 70. The tab members 80, 85 engage the cap 75 and allow it to move from an inserted position to a sealed position. The cap 75 is rotatable about the inlet axis A—A between the inserted position and the sealed position.

Figure 3:
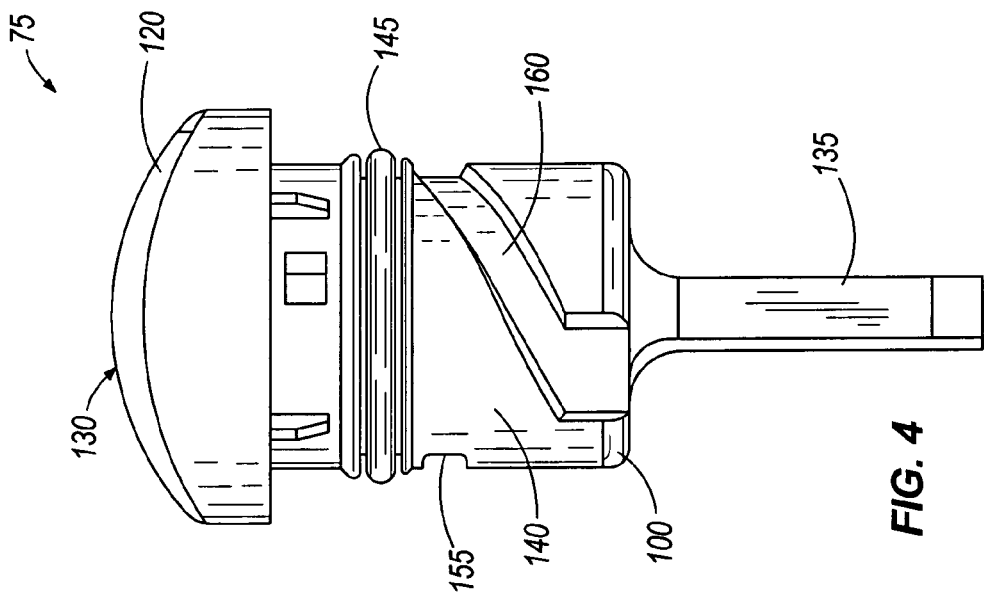
FIG. 3 is a side view of the oil tank cap of FIG. 2 in an extended position.
Figure 4:
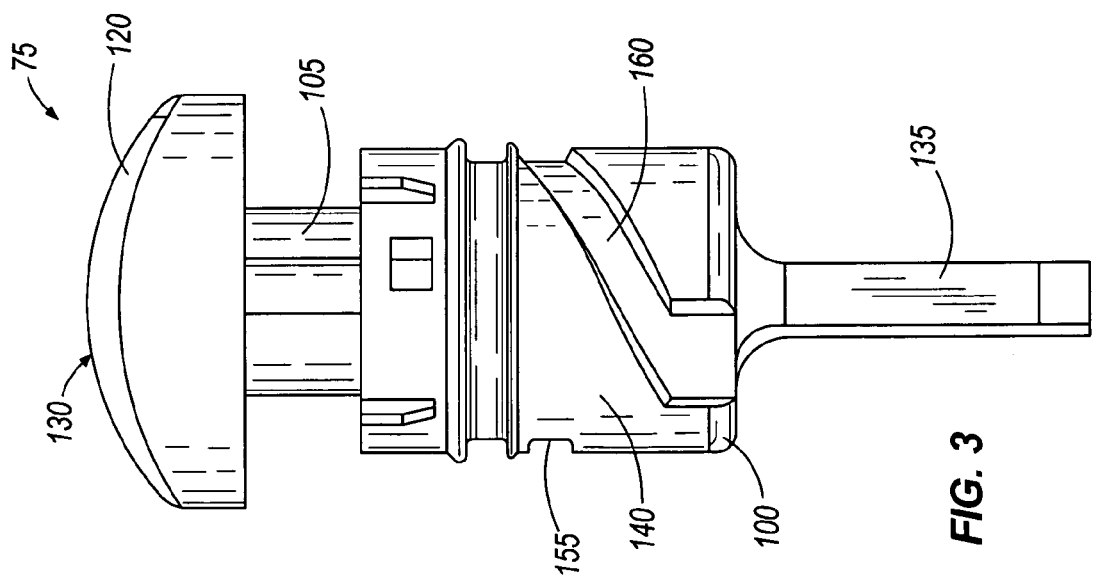
FIG. 4 is a side view of the oil tank cap of FIG. 2 in a retracted position.
Figure 5:
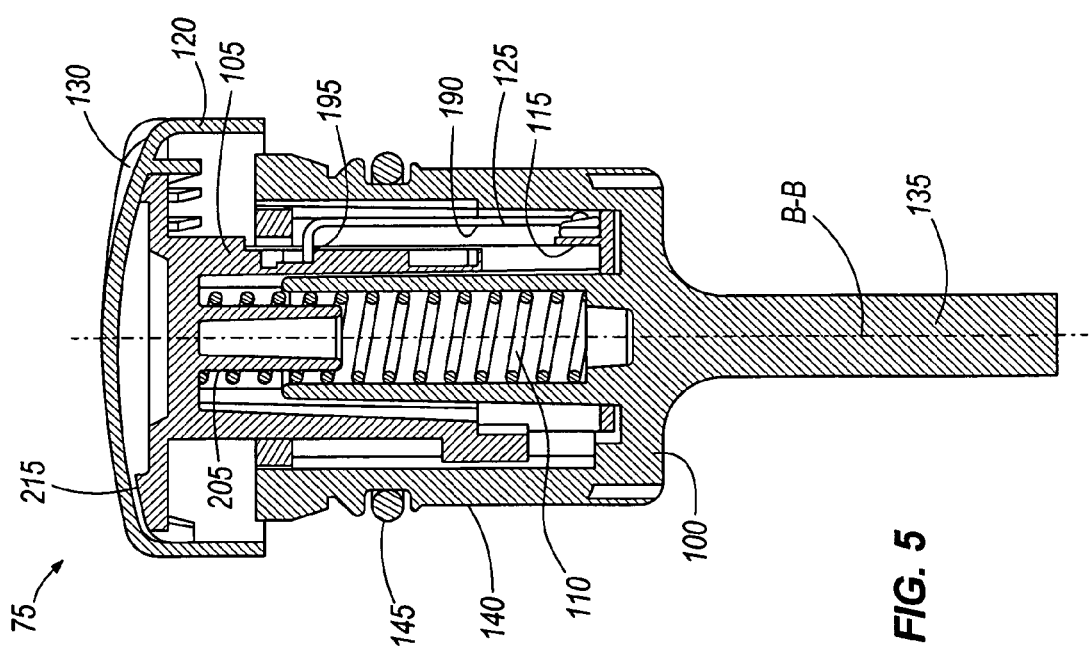
FIG. 5 is a section view of the oil tank cap of FIG. 2.

The cap 75, illustrated in FIGS. 3–5, includes a stationary member 100, a movable member 105, a biasing spring 110, a guide member 115, a cap cover 120, and a guide spring 125. The movable member 105 is movable relative to the stationary member 100 between an extended position, shown in FIG. 3, and a retracted position, shown in FIG. 4.

As shown in FIGS. 3–6, the stationary member 100 includes a dipstick 135 and an engagement surface 140. The dipstick 135 extends into the oil tank 40 and can be used to measure the amount of oil within the tank 40. The stationary member 100 also supports a seal member, such as an O-ring 145 (FIGS. 4 and 5) that is designed to engage an inner surface 150 (see FIG. 2) of the fill spout 60 and provide a substantially liquid-tight seal.

The engagement surface 140 is substantially cylindrical and includes a first helical engagement groove 155 and a second helical engagement groove 160. The two grooves 155, 160 are positioned on opposite sides of the cylindrical engagement surface 140 and are substantially rectangular in cross-section. The first helical groove 155 has a width that is smaller than the width of the second helical groove 160. Thus, the second helical groove 160 is able to receive either of the large tab member 80 or the small tab member 85, while the first helical groove 155 is sized to only receive the small tab member 85. This arrangement inhibits the insertion of the cap 75 into the oil tank 40 in any orientation other than a desired orientation.

Other engagement systems could be used to allow for the insertion of the cap 75 in only one orientation. For example, engagement grooves spaced apart from one another such that they are not symmetric about the axis of the cap and inlet A—A would achieve the same result. In still other constructions, different height tab members could be used, rather than different widths. As will be apparent to one of ordinary skill, there are many different ways of assuring that the cap 75 is only inserted into the fill spout 60 in a desired orientation.

Figure 6:
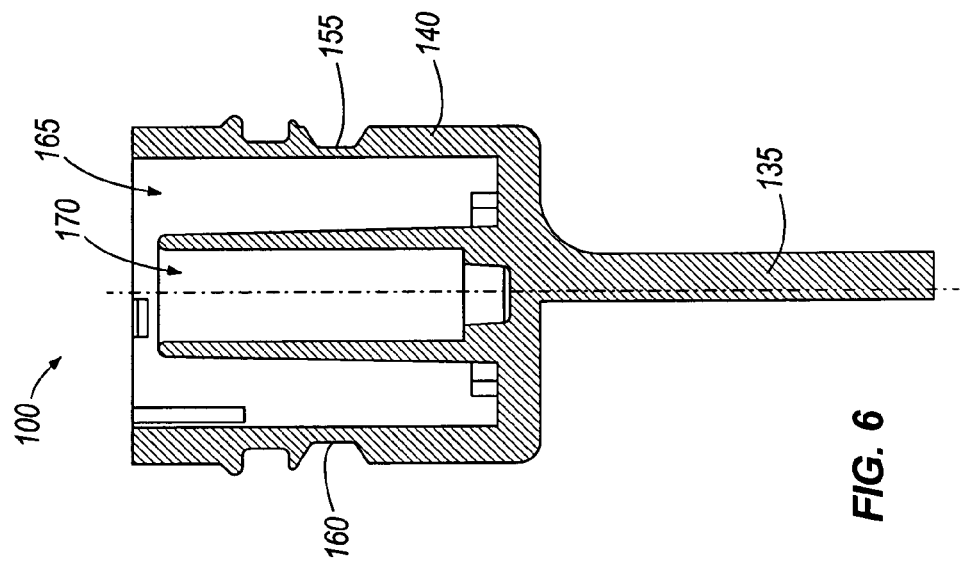
FIG. 6 is a section view of a stationary member of the oil tank cap of FIG. 2.

As shown in FIG. 6, the stationary member 100 defines an annular chamber 165 and a cylindrical chamber 170. The chambers 165, 170 contain the components that make up the cap 75 as will be described below.

Figure 14:
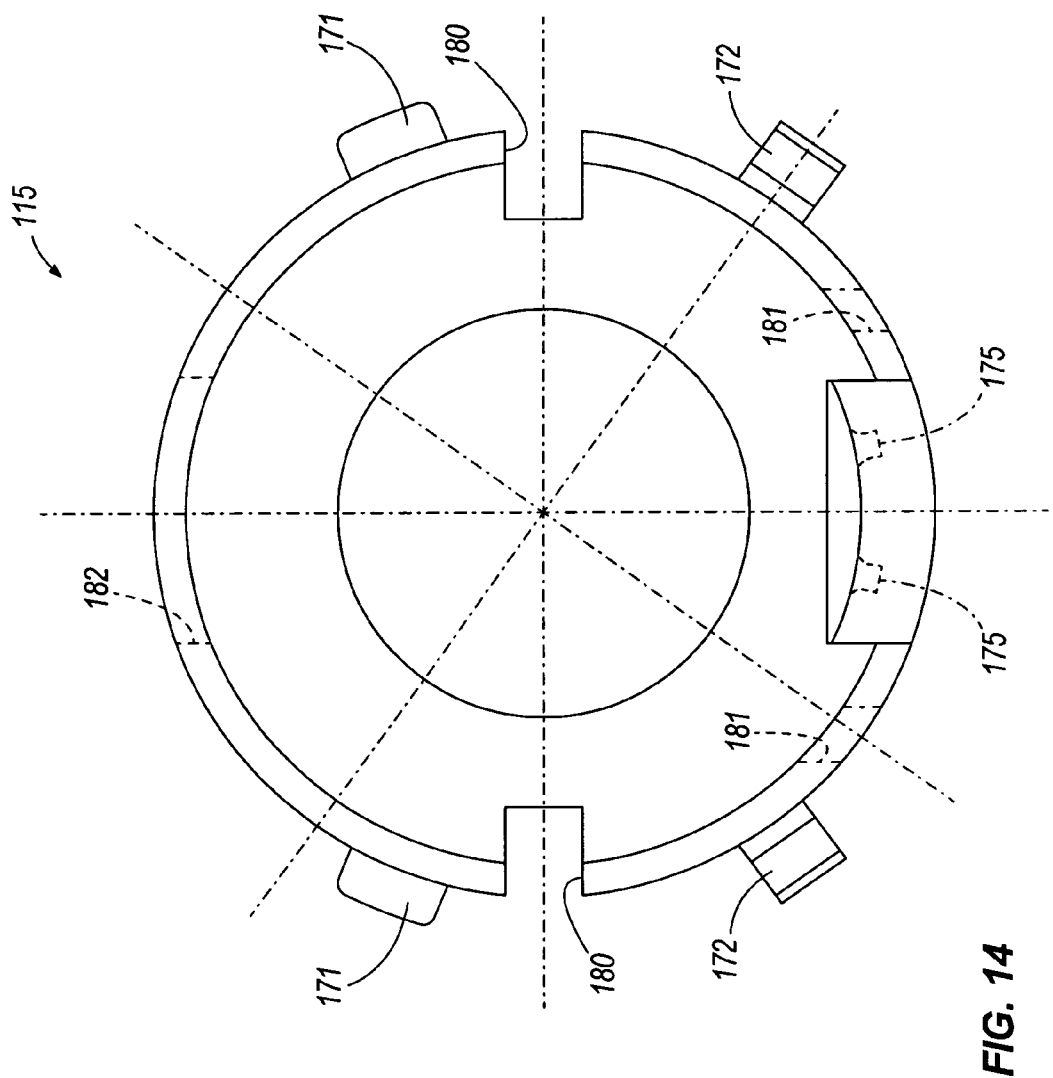
FIG. 14 is a bottom view of the guide member of FIG. 8.

The guide member 115, shown in FIGS. 8 and 14, fits substantially within the annular chamber 165 of the stationary member 100 and is substantially fixed relative to the stationary member 100. The guide member 115 includes two displaceable locking members 171 that engage apertures within the stationary member to fix the guide member 115. In addition, two keys 172 fit within slots provided in the stationary member 100 to assure proper alignment and positioning of the guide member 115 within the stationary member 100.

The guide member 115 includes two protrusions 175 that are positioned to fixedly support the guide spring 125. The guide member 115 also includes two full-length axial slots 180 that engage and guide the movable member 105 during movement of the movable member 105 between the retracted and extended positions. In addition to the full-length slots 180, two partial length slots 181 are provided in the guide member to further guide the movable member 105. The guide member also includes a wide slot 182 positioned on the opposite side of the guide member relative to the two protrusions 175. The wide slot cooperates with the partial length slots 181 to inhibit excess extension of the movable member 105 as well as to guide the movable member's axial movement.

Figure 9:
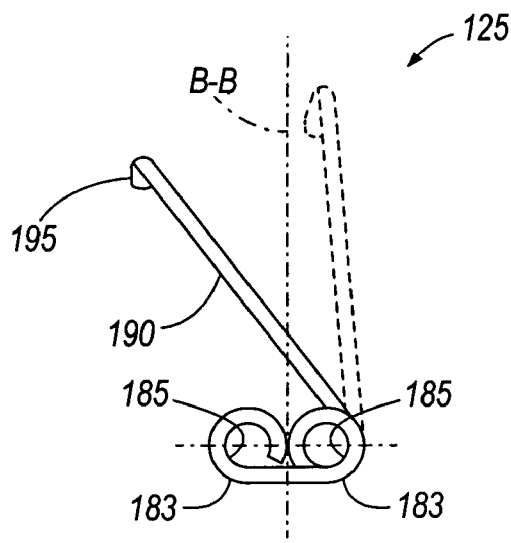
FIG. 9 is a front view of a guide spring of the oil tank cap of FIG. 2.
Figure 10:
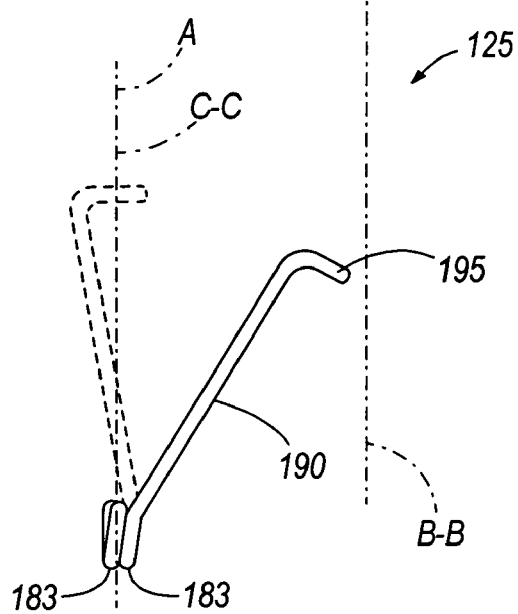
FIG. 10 is a side view of the guide spring of FIG. 9.

Turning to FIGS. 9 and 10, the guide spring 125 includes two loop portions 182 that define two apertures 185 that engage the two protrusions 175 of the guide member 115 to firmly support the guide spring 125. The guide spring 125 also includes an arm portion 190 that extends from the loop portions 183 to a hook portion 195. FIG. 9 illustrates the spring 125 in its free state. The hook portion 195 is positioned to the left of a cap centerline B—B in this free state. Once the cap 75 is assembled, the hook portion 195 is forced to the right (as shown in broken lines in FIG. 9) such that it produces a biasing force to the left as it attempts to return to the free state. Referring to FIG. 10, the hook portion 195, in the guide spring's free state, extends substantially out of the plane C—C defined by the apertures 185. However, once the cap 75 is assembled, the hook 195 is forced toward the plane C—C defined by the apertures 185 (as shown in broken lines in FIG. 10), thus establishing a biasing force towards the centerline B—B of the cap 75.

Figure 17:
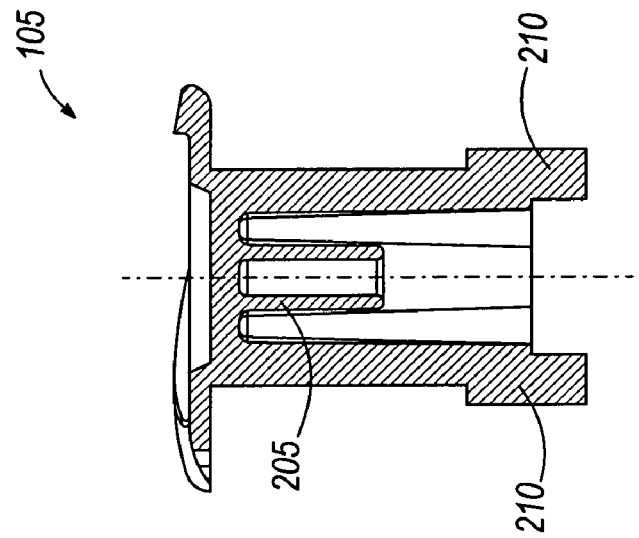
FIG. 17 is a section view of the movable member taken along line 17—17 of FIG. 16.
Figure 16:
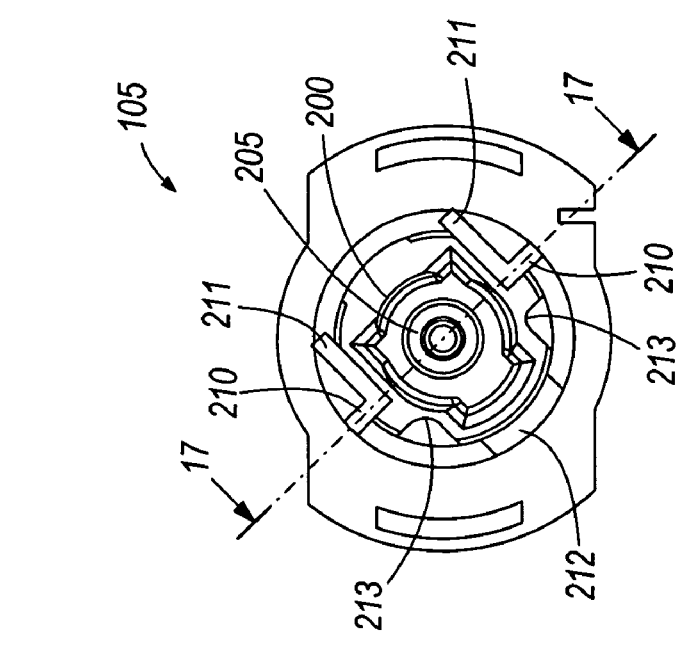
FIG. 16 is a bottom view of the movable member of FIG. 7.

The movable member 105, illustrated in FIGS. 7 and 16–17, fits within the guide member 115 and is movable between the retracted position and the extended position. The movable member 105 includes a cam surface 200 (shown in detail in FIGS. 11 and 15), a spring seat 205, two full length guides 210, two small guide stops 211, one large guide stop 212, two recesses 213, and a cap cover mount 215. The cap cover mount 215 provides an attachment point for the cap cover 120. Once attached, the cap cover 120 moves with the movable member 105 between the retracted and extended positions.

The two full-length guides 210 engage the full-length slots 180 of the guide member 115 to guide the movement of the movable member 105 in a substantially axial direction. To further guide the movable member 105, the two small guide stops 211 engage the partial length slots 181, while the large guide stop 212 engages the wide slot 182. Thus, five guides engage five slots to provide substantially axial movement of the movable member 105 relative to the guide member 115. The large guide stop 212 and two small guide stops 211 cooperate with their respective slots to stop the extension of the movable member 105 relative to the guide member 115 at the desired extracted position. Because the slots do not extend the full length of the guide member 115, they act to limit the axial travel of the guide stops 211, 212.

It should be noted that while the movable member 105 and guide member 115 have been described as including five guides engaged with five slots, more or less guides and slots could be used.

The recesses 213 of the movable member 105 provide space for movement of the locking members 171 during assembly and disassembly of the movable member 105 into the guide member 115.

The spring seat 205 provides support for one end of the biasing spring 110. The stationary member 100 supports the second end of the spring 110 within the cylindrical chamber 170 such that the movable member 105 is biased towards the extended position. The guides 210 each engage one of the slots 180 in the guide member 115 to inhibit rotation of the movable member 105 relative to the stationary member 100. The guides 210 are free to slide within the slots 180 in a direction that is substantially parallel to the longitudinal centerline B—B of the cap 75.

Figure 11:
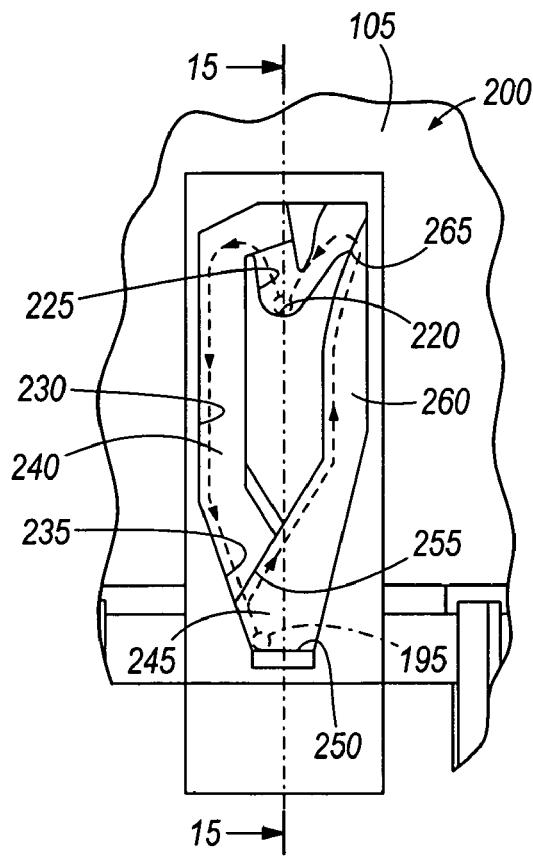
FIG. 11 is an enlarged view of a cam surface of the movable member of FIG. 7.

The cam surface 200, illustrated in FIG. 11 engages the hook portion 195 of the guide spring 125 to lock the movable member 105 in one of the extended or retracted positions. The hook portion 195 is displaced from its free state to engage the cam surface 200. As shown in FIG. 5, the guide spring 125 is displaced such that the hook 195 applies a biasing force toward the cam surface 200 (i.e. toward the axis of the cap B—B in FIG. 5). This biasing force assures that the hook 195 will remain in contact with the cam surface 200 during operation of the cap 75. The shape of the guide spring 125 also biases the hook portion 195 toward the left side of the cam surface 200 as the cam surface 200 is illustrated in FIG. 11.

Figure 13:
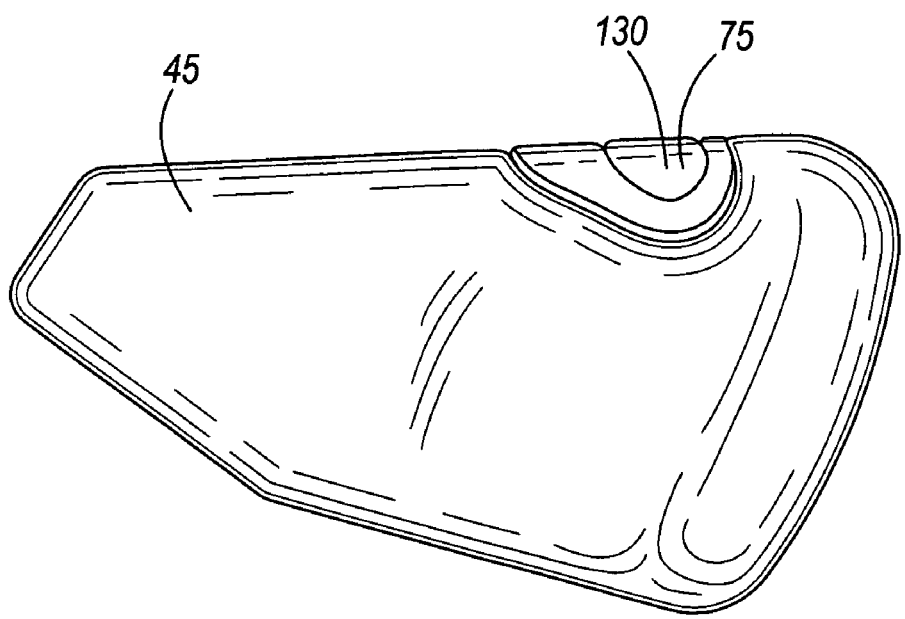
FIG. 13 is a side view of the oil tank cap in a sealed and retracted position within an oil tank having a cover.

The cap cover 120 fixedly attaches to the movable member 105 to provide a visually appealing outer surface 130. In lubrication systems that include a cover 45, the top surface of the cap cover 130 is contoured to substantially match the contour of the cover 45, as illustrated in FIG. 13. Alternatively, the cap cover 120 can be contoured to match the contour of the outer surface 130 of the tank 40 when a cover 45 is not utilized. It should be noted that when the cap cover 120 is described as matching the contour of the outer surface 130 of the tank 40, this should also be interpreted to include matching the contour of the cover 45, if present.

The cover 45 may include multiple intersecting surfaces in the area of the fill spout 60, thus requiring a non-symmetric cap cover 120. When a non-symmetric cap cover 120 is employed, the cap cover 120 must be oriented properly relative to the cover 45 in order for the contours to align.

In other constructions, a substantially flat or a slightly domed cap cover will match the contour of the cover 45 and/or provide a visually appealing look. It should also be noted that the invention does not require that the cap 75 blend in with the cover 45 or the oil tank 40. In fact, other constructions in which the surfaces purposely do not blend are also contemplated by the present invention.

Figure 15:
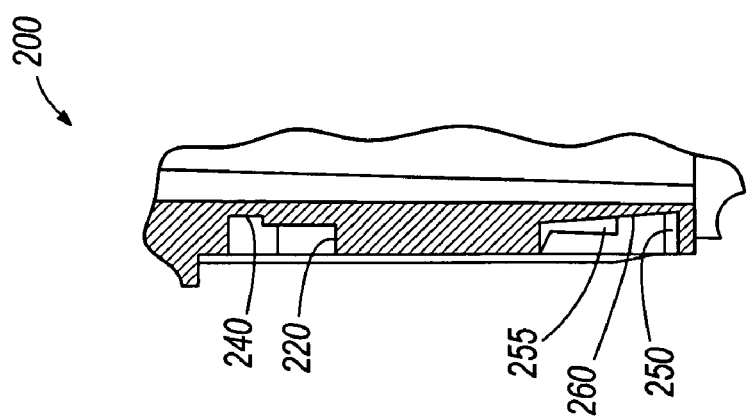
FIG. 15 is a section view of the cam surface taken along line 15—15 of FIG. 11.

With reference to FIGS. 11 and 15, the cam surface 200 includes radial guide surfaces and lateral guide surfaces. The radial guide surfaces support the guide spring 125 and resist the bias force that is established when the hook 195 is moved toward the plane C—C of the apertures 185, as shown in FIG. 10. The lateral guide surfaces support the guide spring 125 and resist the bias force that is established when the guide spring 125 is moved to the right as shown in FIG. 9.

In the retracted position, the hook 195 is trapped within an upper pocket 220 in the cam surface 200. As the cap cover 120 is depressed, the cam surface 200 moves downward and the hook 195, which is biased to the right of its free position, follows a first lateral guide surface 225 that defines the left side of the pocket 220. Once the cap cover 120 is depressed a sufficient amount, the top of the first lateral guide surface 225 falls below the hook 195, thereby allowing the hook 195 to move against a second lateral guide surface 230. When the user releases the cap cover 120, the biasing spring 110 biases the movable member 105 up. As the cam surface 200 moves up, the second lateral guide surface 230 moves past the hook 195 and a third lateral guide surface 235 engages the hook 195. Up to this point, the hook 195 has been following a first radial guide surface 240. However, as the cam surface 200 continues to move up, the hook 195 disengages from the first radial guide surface 240 and engages a second radial guide surface 245. The second radial guide surface 245 is closer to the centerline B—B of the cap 75 then the first radial guide surface 240. Thus, the hook 195 cannot pass from the second radial guide surface 245 back to the first radial guide surface 240. As the movable member 105 continues to move, the small guide stops 211 and the large guide stop 212 engage the guide member 115. Once engaged, the small guide stops 211 and the large guide stop 212 inhibit further extension of the movable member 105, thus defining the extended position, as shown in FIG. 3.

To move the cap cover 120 from the extended position to the retracted position, the user again depresses the cap cover 120. As the cover 120 is depressed, the hook 195 follows a fourth lateral guide surface 255. The fourth lateral guide surface 255 forces the hook 195 to the right as the cap cover 120 is depressed. In addition to the rightward movement, the hook 195 also moves toward the plane C—C of the apertures 185 as the hook 195 follows a third radial guide surface 260. A step is provided between the end of the third radial guide surface 260 and the second radial guide surface 245 just beyond the retracted position. Thus, as the cap cover 120 is depressed beyond the retracted point, the hook 195 will drop down the step (i.e., toward the cap 75 centerline B—B) between the third radial guide surface 260 and the second radial guide surface 245. Once the cap cover 120 is depressed to a point slightly beyond the fully retracted position, a cam surface peak 265 falls below the hook 195 and the hook 195 is free to move to the left. The hook 195 moves to the left and contacts the first lateral guide surface 225. Once the user releases the cap cover 120, the cam surface 105 moves up until the hook 195 seats in the upper pocket 220 and the cap cover 120 is in the retracted position.

It should be noted that the cap 75, the cap cover 120, the movable member 105, and the cam surface 200 are all interconnected. As such, these components move together when the cap 75 is moved between its retracted and extended position. Thus, in the foregoing description, these terms are used interchangeably. However, it should be clear that movement of any one of the cap cover 120, the movable member 105, or the cam surface 200 will result in the movement of the two remaining components.

To insert the cap 75 into the fill spout 60, the user simply places the cap 75 into the aperture 70 and rotates it about the inlet axis A—A until the large tab member 80 aligns with the second helical groove 160 and the small tab member 85 aligns with the first helical groove 155. Continued rotation will cause the cap 75 to be pulled into the fill spout 60 as the grooves 155, 160 slide across the tabs 80, 85. Once rotation is complete, the cap cover 120 is depressed to lock the cap cover 120 in the retracted position. When the cap 75 is positioned in the sealed and retracted position, the top surface 130 of the cap cover 120 is substantially flush with the outer surface of the cover 45.

Although the invention has been described in detail with reference to certain preferred embodiments, variations and modifications exist within the scope and spirit of the invention as described and defined in the following claims.

What is claimed is:

1. A motorcycle comprising:
   a frame;
   a front wheel coupled to the frame;
   a rear wheel coupled to the frame;
   an engine supported by the frame and adapted to propel the motorcycle;
   an oil tank supported by the frame and including an inlet defining an inlet aperture having an inlet axis; and
   an oil tank cap rotatable about the inlet axis between an inserted position and a sealed position, the oil tank cap having a movable portion movable substantially along the inlet axis between a retracted position and an extended position, wherein the outer surface of the movable portion is not planar.

2. The motorcycle of claim 4, wherein the movable portion includes an outer surface and the oil tank includes an outer surface, and the outer surface of the oil tank cap is flush with the outer surface of the oil tank when the oil tank cap is in the sealed position and the movable portion is in the retracted position.

3. The motorcycle of claim 2, wherein the oil tank includes a cover member and the outer surface is an outer surface of the cover member.

4. The motorcycle of claim 1, wherein the outer surface of the movable portion is not symmetrical about the inlet axis.

5. The motorcycle of claim 1, wherein the oil tank includes a protrusion and the oil tank cap includes a recess sized to receive the protrusion, the recess located such that the oil tank cap is oriented in a first orientation when in the inserted position.

6. The motorcycle of claim 5, wherein the recess includes a groove, and the protrusion moves along the groove during rotation of the oil tank cap between the inserted position and the sealed position.

7. The motorcycle of claim 1, wherein the oil tank includes a first protrusion and a second protrusion and the oil tank cap includes a first recess and a second recess and wherein the first recess is sized to receive only the first protrusion.

8. The motorcycle of claim 7, wherein the first recess includes a first helical groove and the second recess includes a second helical groove.

9. An oil tank cap for an oil tank having an inlet defining an inlet aperture and an inlet axis, the cap comprising:

a first portion adapted to be inserted into the inlet, the first portion rotatable about the inlet axis between an inserted position and a sealed position; and a second portion mounted to the first portion and movable parallel to the inlet axis relative to the first portion between a retracted position and an extended position, wherein the orientation of the second portion is substantially fixed relative to the first portion.

10. The oil tank cap of claim 9, wherein the second portion includes an outer surface and the oil tank includes an outer surface, the outer surface of the second portion adapted to be flush with the outer surface of the oil tank when the first portion is in the sealed position and the second portion is in the retracted position.

11. The oil tank cap of claim 10, wherein the oil tank includes a cover member and the outer surface of the oil tank is an outer surface of the cover member.

12. The oil tank cap of claim 9, wherein the first portion includes a recess sized to receive an oil tank protrusion, the recess located such that the first and second portions are oriented in a first orientation when in the inserted position.

13. The oil tank cap of claim 12, wherein the recess includes a groove, and the protrusion moves along the groove during rotation of the first and second portions between the inserted position and the sealed position.

14. The oil tank cap of claim 9, wherein the oil tank includes a first protrusion and a second protrusion and the first portion includes a first recess and a second recess and wherein the first recess is sized to receive only the first protrusion.

15. The oil tank cap of claim 14, wherein the first recess includes a first helical groove and the second recess includes a second helical groove.

16. The oil tank cap of claim 9, wherein the first portion includes a first recess and a second recess wider than the first recess.

17. An oil tank cap for an oil tank having an inlet defining an inlet aperture and an inlet axis, the cap comprising:

a first portion adapted to be inserted into the inlet, the first portion rotatable about the inlet axis between an inserted position and a sealed position; and a second portion mounted to the first portion and parallel to the inlet axis relative to the first portion between a retracted position and an extended position, wherein the second portion includes an outer surface and the oil tank includes an outer surface, the outer surface of the second portion adapted to be flush with the outer surface of the oil tank when the first portion is in the sealed position and the second portion is in the retracted position, and wherein the outer surface of the second portion is not planar.

18. The oil tank cap of claim 17, wherein the outer surface of the second portion is not symmetrical about the inlet axis when the first portion is engaged with the inlet.

19. A method of assembling an oil tank having an inlet defining an inlet aperture and an inlet axis, the method comprising:

engaging an oil tank cap with the inlet;

rotating the oil tank cap about the inlet axis from an inserted position to a sealed position;

moving a movable portion of the oil tank cap from an extended position to a retracted position;

maintaining the movable portion of the oil tank cap in the retracted position; and matching the contour of the outer surface of the oil tank cap with the contour of the outer surface of the oil tank when the oil tank cap is in the retracted and sealed positions, wherein moving the movable portion includes moving the movable portion such that an outer surface of the oil tank cap is substantially flush with an outer surface of the oil tank.

20. The method of claim 19, wherein moving a movable portion includes pressing and releasing the movable portion.

* * * * *

UNITED STATES PATENT AND TRADEMARK OFFICE
CERTIFICATE OF CORRECTION

| | |
|---|---|
| PATENT NO. | : 6,983,814 B2 |
| APPLICATION NO. | : 10/617536 |
| DATED | : January 10, 2006 |
| INVENTOR(S) | : Jeffrey L. Armstrong and Benjamin M. Wright |

It is certified that error appears in the above-identified patent and that said Letters Patent is hereby corrected as shown below:

Claim 2, column 6, line 52 - "claim 4" should be -- claim 1--.

Signed and Sealed this

Twenty-ninth Day of August, 2006

JON W. DUDAS
*Director of the United States Patent and Trademark Office*